(12) United States Patent
Watanabe

(10) Patent No.: US 10,077,019 B2
(45) Date of Patent: Sep. 18, 2018

(54) VEHICLE AIRBAG DEVICE

(71) Applicant: CALSONIC KANSEI CORPORATION, Saitama (JP)

(72) Inventor: Tomohiro Watanabe, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 0 days.

(21) Appl. No.: 15/556,457

(22) PCT Filed: Dec. 4, 2015

(86) PCT No.: PCT/JP2015/084140
§ 371 (c)(1),
(2) Date: Sep. 7, 2017

(87) PCT Pub. No.: WO2016/143206
PCT Pub. Date: Sep. 15, 2016

(65) Prior Publication Data
US 2018/0050650 A1    Feb. 22, 2018

(30) Foreign Application Priority Data

Mar. 9, 2015 (JP) .................................. 2015-045940

(51) Int. Cl.
B60R 21/205    (2011.01)
B60R 21/215    (2011.01)
B60R 21/217    (2011.01)

(52) U.S. Cl.
CPC .......... B60R 21/205 (2013.01); B60R 21/215 (2013.01); B60R 21/217 (2013.01)

(58) Field of Classification Search
CPC .... B60R 21/205; B60R 21/215; B60R 21/217
See application file for complete search history.

(56) References Cited

U.S. PATENT DOCUMENTS 5,303,951 A * 4/1994 Goestenkors ......... B60R 21/215
280/728.3
5,452,913 A * 9/1995 Hansen ................. B60R 21/201
280/728.1
(Continued)

FOREIGN PATENT DOCUMENTS

CN    102317121    1/2012
DE    10 2009 008 383    9/2010
(Continued)

OTHER PUBLICATIONS

International Search Report dated Jan. 19, 2016 in International (PCT) Application No. PCT/JP2015/084140.

*Primary Examiner* — Darlene P Condra
(74) *Attorney, Agent, or Firm* — Wenderoth, Lind & Ponack, L.L.P.

(57) ABSTRACT

The vehicle airbag device includes an airbag module, an airbag lid member, and a reinforcing member. The reinforcing member includes at least an attachment flange part having a fixing part such as a welding part and a module accommodation part. The attachment flange part is provided with a module fixing part, the module fixing part being protruded from an under surface of the attachment flange. The module fixing part is provided with, at a lower end thereof, a fragile part that is broken by a force smaller than a welding force (fixing force) of the welding part and a separation prevention part that keeps connecting a portion below the fragile part to the module fixing part when the fragile part is broken.

4 Claims, 5 Drawing Sheets

(56) References Cited

U.S. PATENT DOCUMENTS

| | | | | |
|---|---|---|---|---|
| 6,325,407 B1* | 12/2001 | Soderquist | ............ | B60R 21/217 |
| | | | | 280/728.2 |
| 8,585,078 B1* | 11/2013 | Witt, Jr. | ................ | B60R 21/207 |
| | | | | 280/728.2 |
| 2010/0102541 A1* | 4/2010 | Shimizu | ................ | B60R 21/201 |
| | | | | 280/728.3 |
| 2012/0007346 A1 | 1/2012 | Morawietz et al. | | |
| 2013/0113191 A1* | 5/2013 | Schneider | ............. | B60R 21/215 |
| | | | | 280/728.3 |
| 2017/0210330 A1* | 7/2017 | Yan | ....................... | B60R 21/205 |

FOREIGN PATENT DOCUMENTS

| | | |
|---|---|---|
| JP | 2010-264803 | 11/2010 |
| JP | 2014-844 | 1/2014 |
| JP | 2014-845 | 1/2014 |
| WO | 2010/091819 | 8/2010 |

* cited by examiner

VEHICLE AIRBAG DEVICE

CROSS-REFERENCE TO RELATED APPLICATION

The present application is based on and claims priority to Japanese Patent Application No. 2015-045940, filed on Mar. 9, 2015, the disclosure of which is hereby incorporated by reference in its entirety.

TECHNICAL FIELD

This disclosure relates to a vehicle airbag device.

BACKGROUND ART

In a vehicle such as an automobile, an instrument panel is installed in the front part inside a vehicle cabin. In a portion of the instrument panel on a passenger seat side, a passenger seat airbag device is installed as a safety device for protecting a passenger in the passenger seat in an emergency.

The airbag device (vehicle airbag device) generally includes an airbag module that houses a bag-like airbag body, an airbag lid member that includes a lid part serving as an opening from which the airbag body inflates, and a reinforcing member that attaches the airbag module to the airbag lid member. The instrument panel is often used as the airbag lid member.

In addition, the reinforcing member includes at least an attachment flange part and a module accommodation part. The attachment flange part includes a welding part that is fixable to a back surface of the airbag lid member by welding. The module accommodation part is capable of accommodating an upper portion of the airbag module (see, JP 2014-844 A, for example).

The upper portion of the airbag module is accommodated in the module accommodation part of the reinforcing member, and a side portion of the airbag module is fixed to the back surface of the airbag lid member.

SUMMARY

Technical Problem

Here, the instrument panel is a large resin molded article. Therefore, when the instrument panel is used as the airbag lid member and a boss part for fixing the side portion of the airbag module is provided on a back surface of the instrument panel, there is a possibility that the structure of the instrument panel or the structure of a mold for manufacturing the instrument panel is complicated or sink marks occur in the instrument panel.

To overcome the above problem, in the vehicle airbag device of the PTL 1, a module fixing part is provided on an under surface of the attachment flange part of the reinforcing member, and the side portion of the airbag module is thereby fixed to the reinforcing member.

However, in the case where the side portion of the airbag module is fixed to the reinforcing member, when the airbag module operates and the airbag body having inflated from the airbag module presses the lid part, a reaction force acts on the welding part between the attachment flange part and the airbag lid member via the module fixing part of the reinforcing member. As a result, that welding part may be damaged and peeled.

To overcome the above problem, the vehicle airbag device of the PTL 1 provides a measure for preventing the peel of the welding part. That is, the vehicle airbag device of the PTL1 teaches to provide a structure for absorbing the reaction force in the airbag module. However, as the structure for absorbing the reaction force is additionally provided on the side of the airbag module, the structure of the airbag module becomes complicated and the cost is increased.

Accordingly, an object of this disclosure is to solve the above problem.

Solution to Problem

In order to solve the above problem, this disclosure teaches a vehicle airbag device that includes an airbag module configured to house a bag-like airbag body, an airbag lid member that includes a lid part serving as an opening from which the airbag body inflates, and a reinforcing member that attaches the airbag module to the airbag lid member. The reinforcing member comprises at least an attachment flange part and a module accommodation part. The attachment flange includes a fixing part that is fixable to a back surface of the airbag lid member, and the module accommodation part is capable of accommodating an upper portion of the airbag module. The reinforcing member includes at least an attachment flange part and a module accommodation part. The attachment flange includes a fixing part that is fixable to a back surface of the airbag lid member, and the module accommodation part is capable of accommodating an upper portion of the airbag module. The attachment flange part is provided with a module fixing part capable of fixing a side portion of the airbag module. The module fixing part is protruded from an under surface of the attachment flange. The module fixing part is provided with, at a lower end thereof, a fragile part that is broken by a force smaller than a fixing force of the fixing part and a separation prevention part that keeps connecting a portion below the fragile part to the module fixing part when the fragile part is broken.

BRIEF DESCRIPTION OF DRAWINGS

FIG. 4 is viewed from another direction.

DESCRIPTION OF EMBODIMENTS

Hereinafter, the present embodiment will be described in detail with reference to the drawings.

FIGS. 1 to 7 are views for illustrating the embodiment.

First Embodiment (Configuration)

Hereinafter, the configuration of the embodiment will be described.

Figure 1:
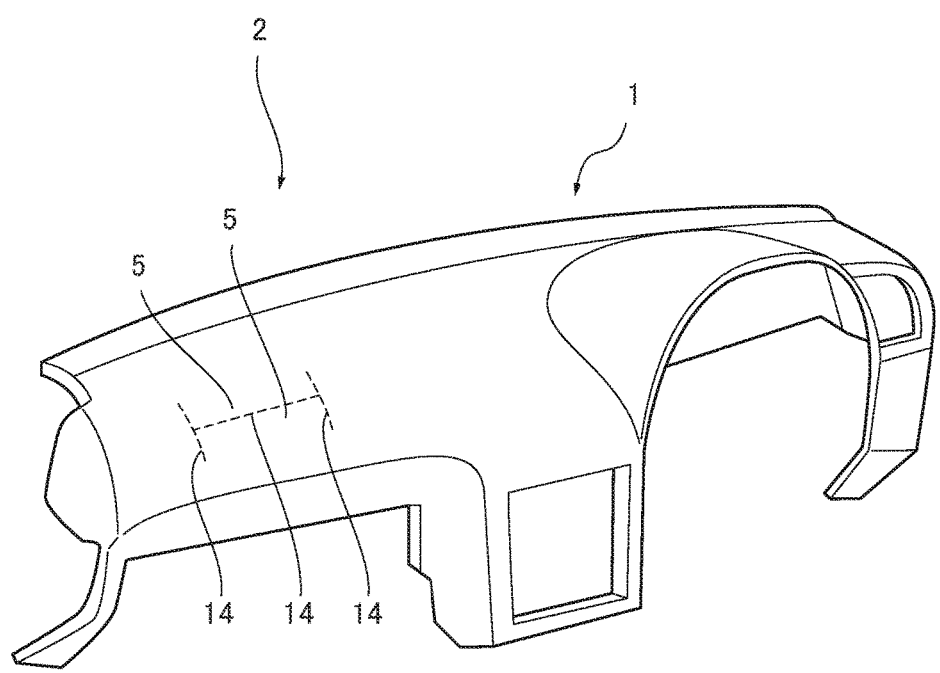
FIG. 1 is a perspective view of an instrument panel provided with a vehicle airbag device according to the present embodiment.

In a vehicle such as an automobile, an instrument panel 1 shown in FIG. 1 is installed in the front part in a vehicle cabin. In a portion of the instrument panel 1 on a passenger seat side, a passenger seat airbag device is installed as a safety device for protecting the passenger in the passenger seat in an emergency.

Figure 2:
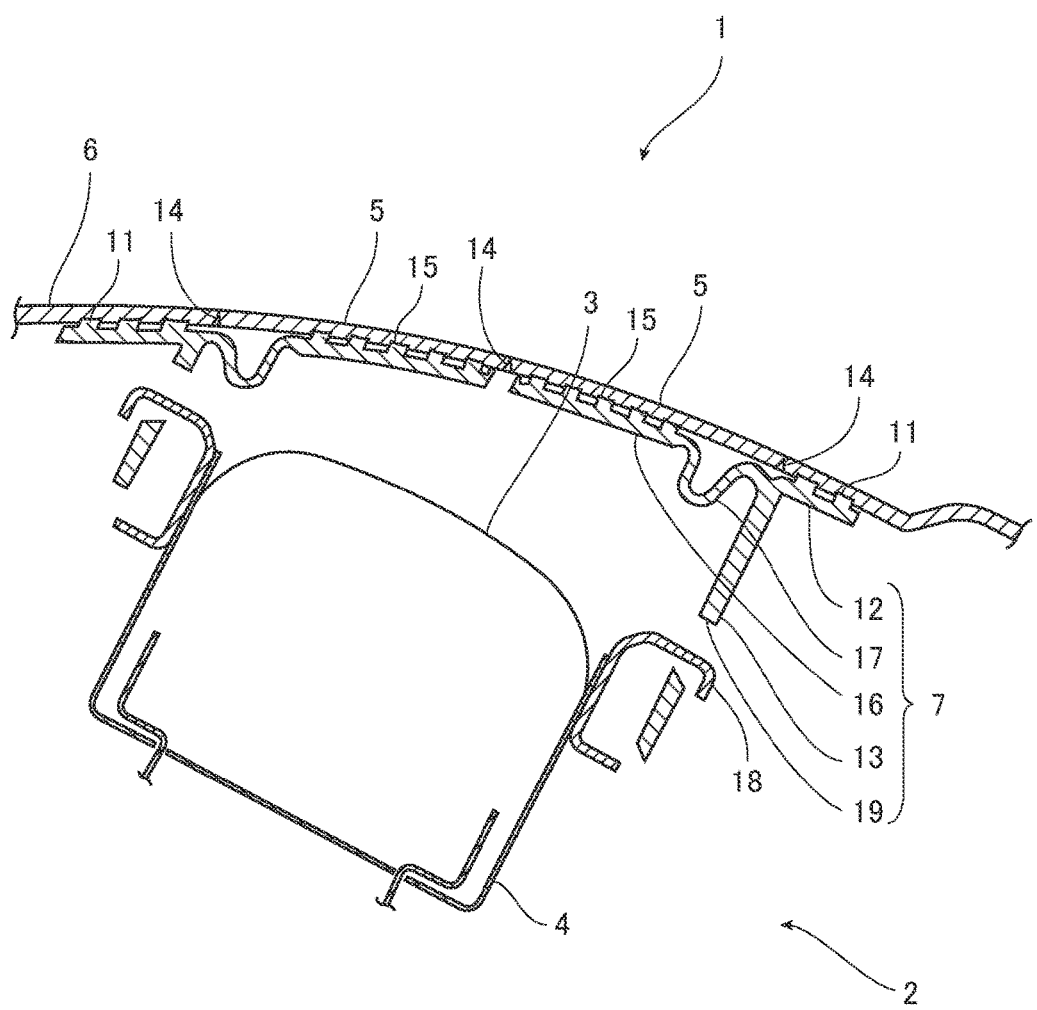
FIG. 2 is a longitudinal sectional view of FIG. 1.

As shown in FIG. 2, the airbag device (vehicle airbag device 2) is configured to include an airbag module 4 that houses a bag-like airbag body 3, an airbag lid member 6 that includes lid parts 5 serving as an opening from which the airbag body 3 inflates, and a reinforcing member 7 that attaches the airbag module 4 to the airbag lid member 6.

In addition, the reinforcing member 7 is configured to include at least an attachment flange part 12 and a module accommodation part 13. The attachment flange includes welding parts 11 (fixing parts) that are fixable to a back surface of the airbag lid member 6 by welding. The module accommodation part 13 is capable of accommodating an upper portion of the airbag module 4.

Herein, the instrument panel 1 is used as the airbag lid member 6. A lower portion of the airbag module 4 is fixed to a vehicle body strength member that is installed inside the instrument panel 1. The lid parts 5 are formed by forming tear lines 14 in the airbag lid member 6. The airbag lid member 6 covers the airbag module 4, and the lid parts 5 open when the airbag body 3 inflates into the vehicle cabin and the opening is thereby formed in the airbag lid member 6.

In addition to the attachment flange part 12 and the module accommodation part 13, the reinforcing member 7 includes a reinforcing door part 16 and a hinge part 17. The reinforcing door part 16 includes welding parts 15 (fixing parts) that are fixable to a back surface of the lid part 5 by welding. The hinge part 17 is formed between the attachment flange part 12 and the reinforcing door part 16 and includes a downwardly folded shape. The module accommodation part 13 also functions as a guide member for guiding the inflation of the airbag body 3. In front and rear side surfaces of the module accommodation part 13, engagement holes 19 that accommodate hook parts 18 provided on front and rear side surfaces of the airbag module 4 are formed such that the hook parts 18 are loosely fitted in the engagement holes 19. Each of the welding parts 11 and the welding parts 15 is a welding rib (fixing rib) or the like. The welding rib is fixed to the back surface of the airbag lid member 6 or the lid part 5 by a vibration welding machine. Fixation by welding allows the welding part 11 and the welding part 15 that are melt/softened by frictional heat caused by vibration and the back surface of the airbag lid member 6 or the lid part 5 to be fused and integrated.

In addition to the basic configuration described above, this embodiment includes the following configuration.

Figure 3:
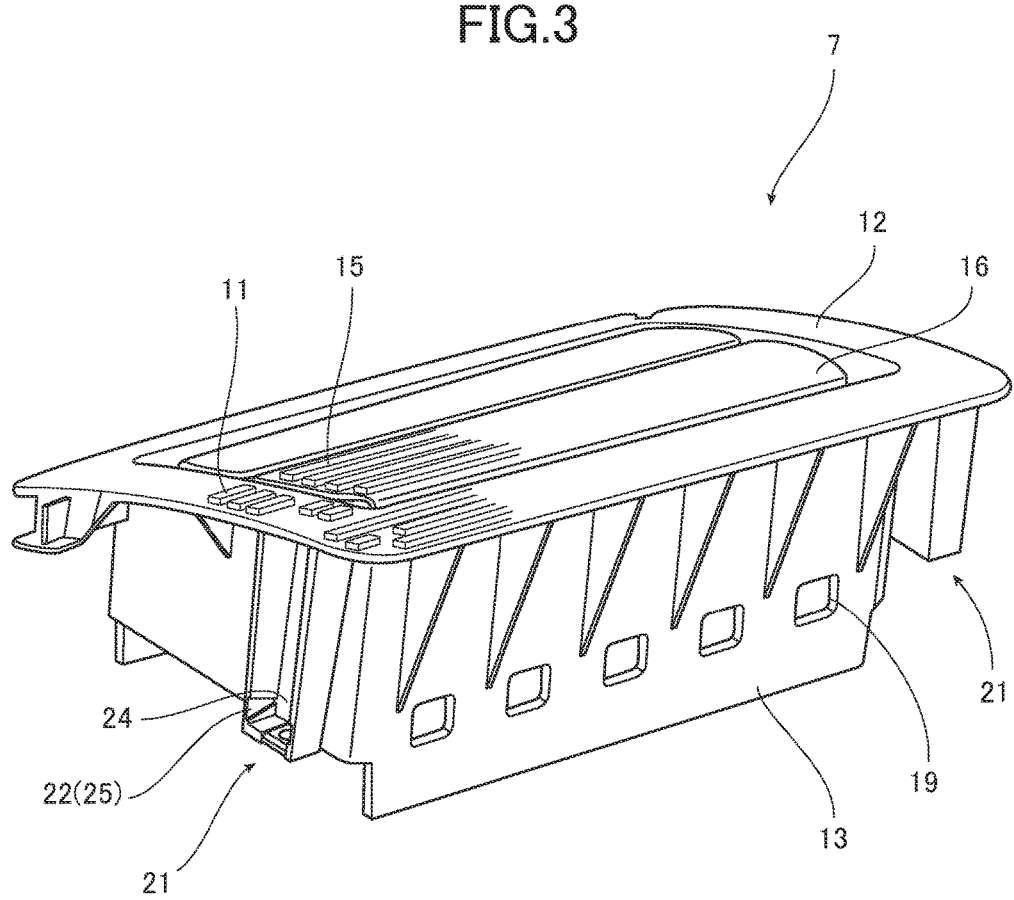
FIG. 3 is a perspective view of a reinforcing member in FIG. 2.

(1) As shown in FIG. 3 (to FIG. 5), module fixing parts 21 that are capable of fixing side portions of the airbag module 4 are provided so as to protrude from an under surface of the attachment flange part 12. At a lower end of each module fixing part 21, the reinforcing member 7 is provided with fragile parts 22 and a separation prevention part 24. The fragile parts 22 are designed to be broken by a force smaller than a welding force (fixing force) of the welding part 11 (fixing part). The separation prevention part 24 functions to keep connecting a portion 40 below the fragile part 22 to the module fixing part 21 when the fragile part 22 is broken.

Herein, the attachment flange part 12 is configured to have minimum width dimensions that do not require an unnecessary increase in width or useless provision of an overhanging part in order to provide the module fixing part 21.

The module fixing part 21 is provided at a peripheral portion positioned at a side portion of the attachment flange part 12 in a vehicle width direction so as to be spaced from the side surface of the module accommodation part 13. Note that it is possible to provide a connecting rib in an upper portion between the module fixing part 21 and the side surface of the module accommodation part 13. The connecting rib is used as a reinforcing part for securing the strength of the module fixing part 21 by coupling upper portions of the module fixing part 21 and the side surface of the module accommodation part 13 to each other, and is also used as an applying part for applying a welding jig when the welding part 11 is welded. On an upper surface of a portion of the attachment flange part 12 in which the module fixing part 21 is provided, a portion without the welding part 11 (non-welding part) is formed.

Figure 4:
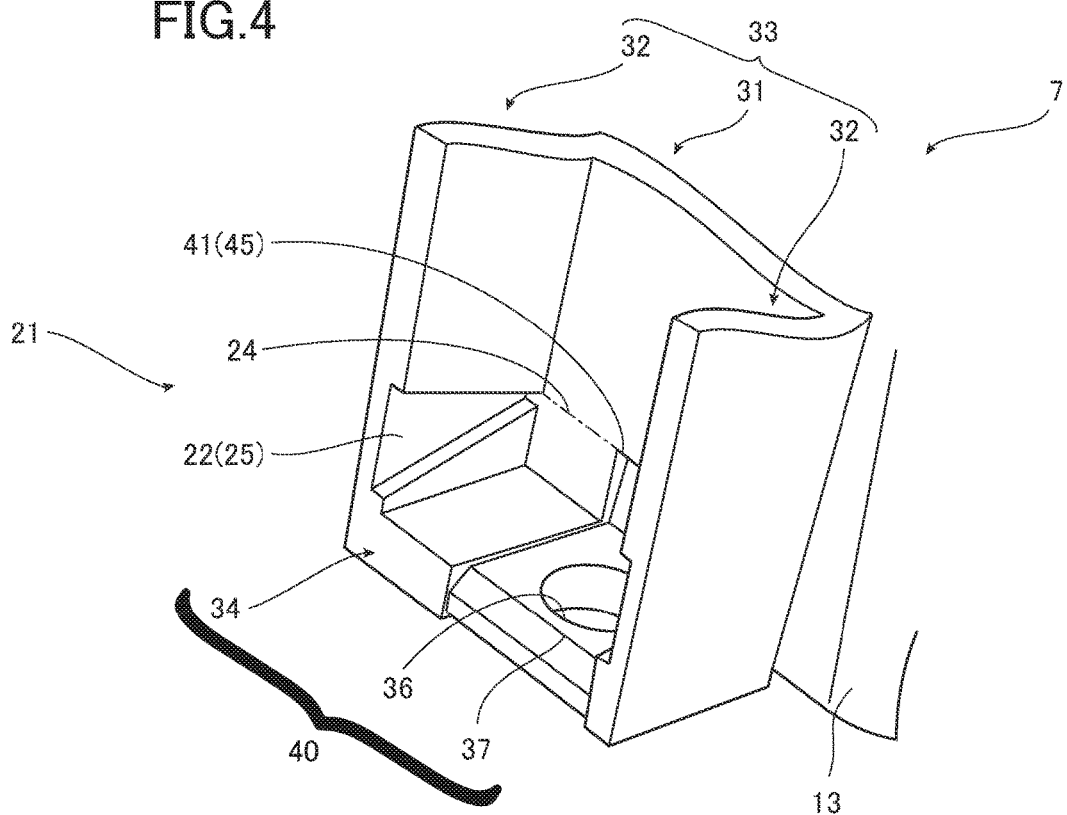
FIG. 4 is an enlarged view of a lower portion of a module fixing part in FIG. 3.
Figure 5:
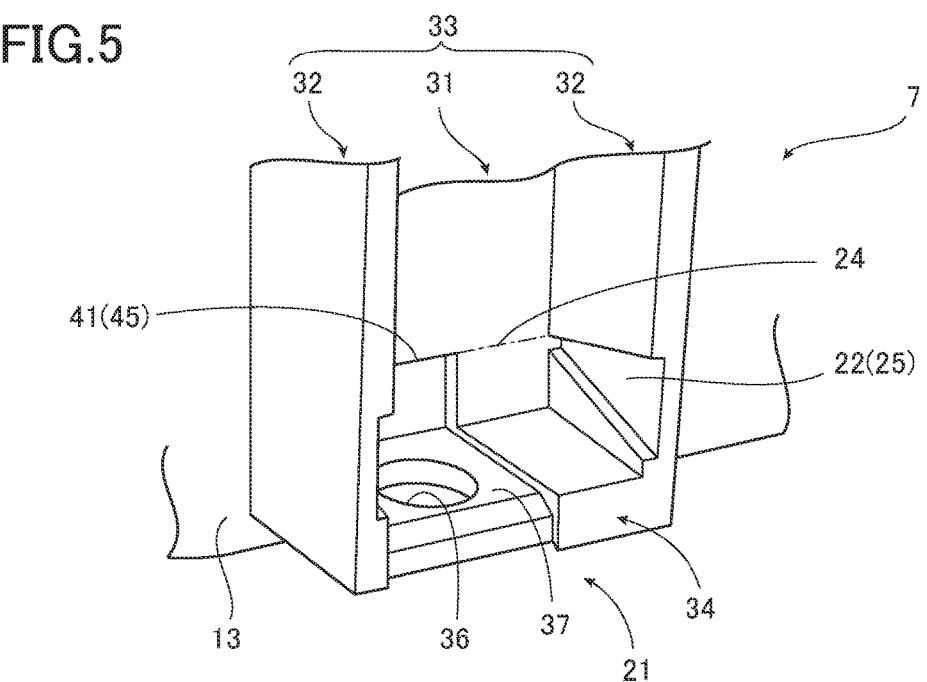
FIG. 5 is a perspective view when

(2) As shown in FIGS. 4 and 5, the module fixing part 21 is configured to include a downwardly extended part 33 having a C-shaped or U-shaped cross section and an end surface formation part 34. The downwardly extended part 33 includes a vertical surface part 31 and a pair of side surface parts 32 extending from both side portions of the vertical surface part 31. The end surface formation part 34 serves as a lower end surface of the downwardly extended part 33 and also serves as an attachment surface of the airbag module 4. The fragile part 22 is formed as a gradually width-reduced shape part 25 of which the width is gradually reduced with approach to the separation prevention part 24. The gradually width-reduced shape part 25 is formed as a thin part that is formed in each of the pair of the side surface parts 32, and has a triangular shape when viewed from the side. Further, the separation prevention part 24 is formed at a position in the vertical surface part 31 that laterally joins a far-side end of each of the gradually width-reduces shape parts formed in each of the pair of the side surface parts 25.

Herein, in the downwardly extended part 33, a surface on the side opposite to the side surface of the module accommodation part 13 is an open surface. In the end surface formation part 34, a screw hole 36 for attachment of the airbag module 4 is formed, and a thin attachment seat part 37 for attachment of a metal J-nut is formed around the screw hole 36. The J-nut is attachment hardware that is formed by folding one metal sheet into two and is attached to the end surface formation part 34 so as to pinch both surfaces of the end surface formation part 34. The gradually width-reduced shape part 25 is configured to be reduced in width such that a far-side end thereof converges to a point. In the fragile part 22, a load required for breakage the gradually width-reduced shape part 25 is set by optimally adjusting the thickness of the gradually width-reduced shape part 25 formed as the thin part. Note that it will be easily understood that the gradually width-reduced shape part 25 has a thickness that does not allow the breakage unless there is an emergency.

(3) The separation prevention part is provided with a hinge formation part 41.

Herein, the hinge formation part 41 literally means a shape for allowing the vertical surface part 31 to be actively used as a hinge. By setting the shape and thickness of the hinge formation part 41 to the shape and thickness different from those of the other portions of the vertical surface part 31, it becomes possible to cause the vertical surface part 31 to function as the hinge. In this case, the hinge formation part 41 is an extended thin part 45 formed by extending the attachment seat part 37 for the attachment of the metal J-nut to the position of the separation prevention part 24 of the vertical surface part 31. The hinge formation part 41 can also be a thin part that laterally extends along the position of the separation prevention part 24, a thick part, or a U-groove-shaped or U-shaped elastic hinge part.

Figure 6:
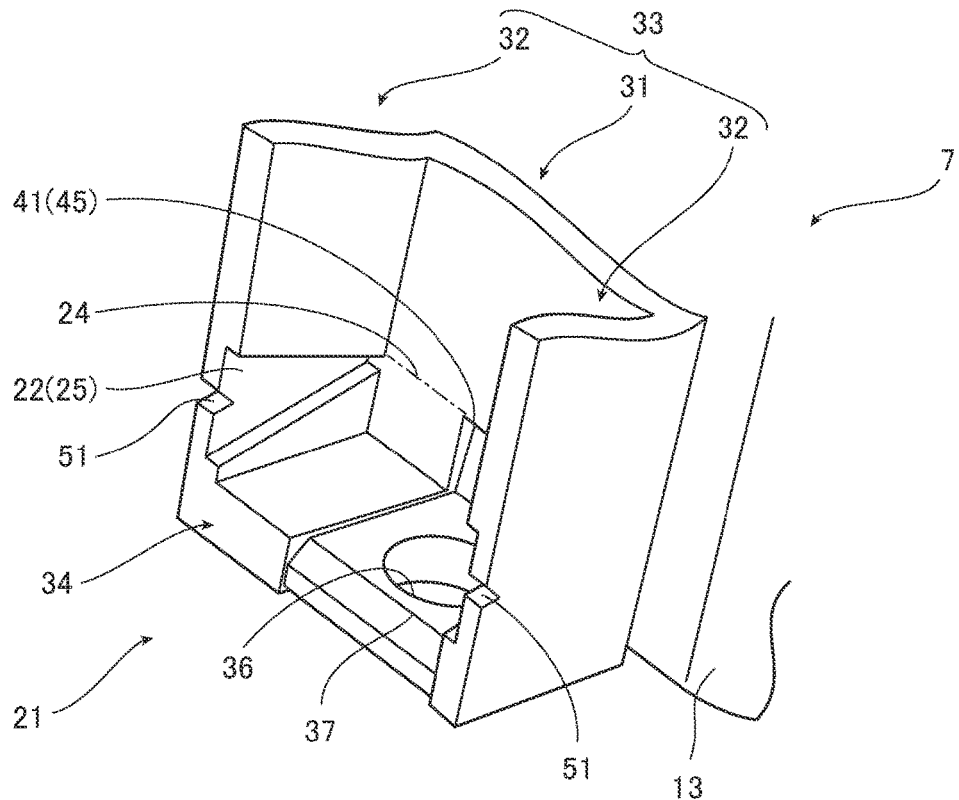
FIG. 6 is an enlarged view similar to FIG. 4 in which a notch part is provided in a fragile part.
Figure 7:
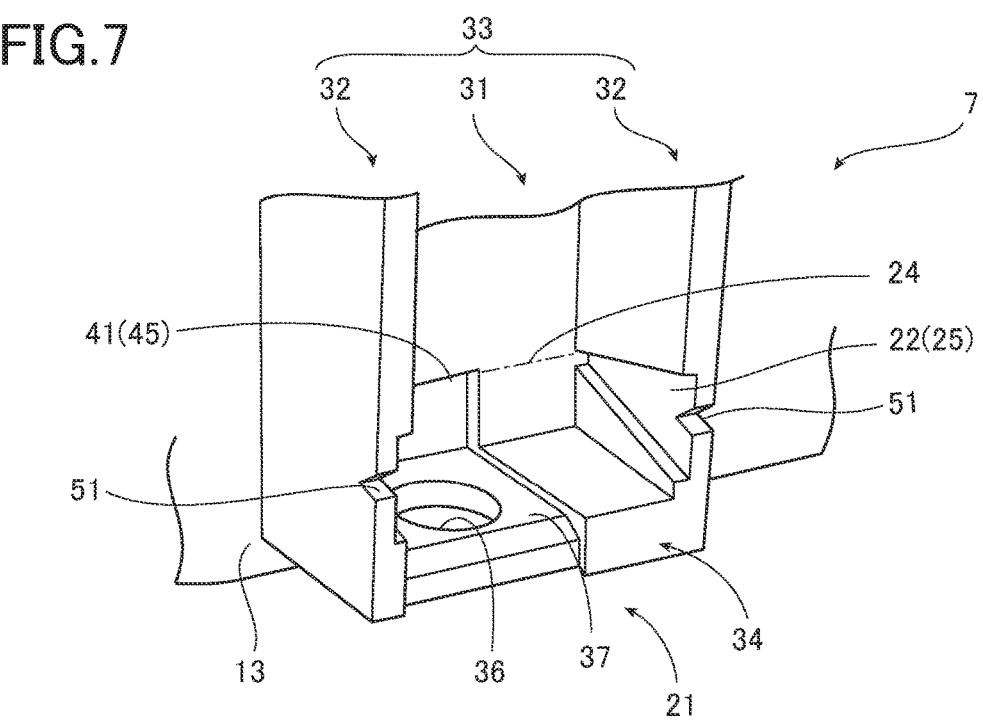
FIG. 7 is a perspective view similar to FIG. 5 in which the notch part is provided in the fragile part.

(4) As shown in modifications in FIGS. 6 and 7, a notch part 51 serving as a breakage starting point may be provided at the front of the fragile part 22.

Herein, the notch part 51 is, e.g., a triangular notch. The notch part 51 can be provided at any position such as a middle portion or an upper or lower end of the gradually width-reduced shape part 25 on a near side. The fragile part 22 is capable of adjusting the load required for the breakage by the notch part 51.

(Operation and Effect)

According to this embodiment, it is possible to obtain the following operation and effect.

In the passenger seat airbag device (vehicle airbag device 2), in an emergency, the airbag body 3 housed in the airbag module 4 inflates, presses the lid part 5, breaks the tear line 14, and opens the lid part 5 to thereby form the opening in the airbag lid member 6, and then the airbag body 3 further inflates from the formed opening to a passenger side in the vehicle cabin to thereby receive the body of the passenger in the passenger seat who is properly seated in the passenger seat, and protect and hold the body thereof.

(Operation and Effect 1)

In this embodiment, the side portion of the airbag module 4 is fixed to the module fixing part 21 that is provided so as to protrude from the under surface of the attachment flange part 12. With this, the airbag module 4 is indirectly fixed to the airbag lid member 6 via the reinforcing member 7. When the airbag module 4 operates, in the case where the airbag body 3 having inflated from the airbag module 4 presses the lid part 5, it follows that a reaction force acts on the welding part 11 between the attachment flange part 12 and the airbag lid member 6 via the module fixing part 21 of the reinforcing member 7.

At this point, when the reaction force exceeds the welding force (fixing force) of the welding part 11 (fixing part), there is a possibility that the welding part 11 is peeled. Therefore, in the present embodiment, the fragile part 22 of the module fixing part 21 is designed to be broken before the welding part 11 is peeled. With this, it is possible to absorb the reaction force so as to prevent the welding part 11 from being peeled. In addition, when the fragile part 22 is broken, the separation prevention part 24 keeps connecting the portion 40 below the fragile part 22 to the module fixing part 21. With this, the detachment of the airbag module 4 is prevented.

As a result, it becomes possible to absorb the reaction force on the side of the reinforcing member 7, and it is possible to simplify the structure for absorbing the reaction force to reduce the cost. In addition, it becomes possible to prevent the welding part 11 from being peeled without increasing the welding force by increasing the size of the attachment flange part 12 to increase the number of the welding parts 11. Thus, it is possible to downsize the attachment flange part 12 and/or the reinforcing member 7.

(Operation and Effect 2)

The fragile part 22 is formed as the gradually width-reduced shape part 25. With this, it is possible to cause the fragile part 22 to be broken toward the separation prevention part 24. In addition, the gradually width-reduced shape part 25 is formed as the thin part that has a triangular shape when viewed from the side. With this, it is possible to reliably cause the pair of the side surface parts 32 to be broken toward the separation prevention part 24 using the gradually width-reduced shape part 25 that has a triangular shape when viewed from the side, and cause the separation prevention part 24 to function as the center of rotation (rotation center part) of the broken lower portion. With this, it is possible to effectively release the reaction force of the pressing force of the airbag body 3 in the reinforcing member 7 using the breakage of the gradually width-reduced shape part 25 and the rotation of the lower portion.

(Operation and Effect 3)

The hinge formation part 41 is provided in the separation prevention part 24. With this, the hinge formation part 41 is capable of causing the separation prevention part 24 to actively perform the movement of the hinge. Therefore, it is possible to determine the center of the rotation to efficiently release the reaction force of the pressing force of the airbag body 3, and absorb and relieve the force acting on the separation prevention part 24 using the rotation.

(Operation and Effect 4)

The notch part 51 is provided at the front of the fragile part 22. With the notch part 51, it is possible to make the breakage starting point of the fragile part 22 clear. As a result, it is possible to facilitate the breakage of the fragile part 22 and determine the manner of the breakage of the fragile part 22 to stabilize the breakage.

REFERENCE SIGNS LIST

2 Vehicle airbag device
3 Airbag body
4 Airbag module
5 Lid part
6 Airbag lid member
7 Reinforcing member
11 Welding part
12 Attachment flange part
13 Module accommodation part
21 Module fixing part
22 Fragile part
24 Separation prevention part
25 Gradually width-reduced shape part
31 Vertical surface part
32 Side surface part
33 Downwardly extended part
34 End surface formation part
41 Hinge formation part
51 Notch part

The invention claimed is:

1. A vehicle airbag device comprising:
an airbag module configured to house an airbag body;
an airbag lid member that includes a lid part serving as an opening from which the airbag body is configured to inflate; and
a reinforcing member that attaches the airbag module to the airbag lid member,
wherein the reinforcing member comprises at least an attachment flange part and a module accommodation part, the attachment flange part including a fixing part that is fixable to a back surface of the airbag lid member and the module accommodation part being capable of accommodating an upper portion of the airbag module,
wherein the attachment flange part is provided with a module fixing part capable of fixing a side portion of the airbag module, the module fixing part protruding from an under surface of the attachment flange part, and
wherein the module fixing part is provided with, at a lower end thereof, a fragile part that is configured to be broken by a force smaller than a fixing force of the fixing part and a separation prevention part that is configured to keep a portion of the reinforcing member below the fragile part connected to the module fixing part when the fragile part is broken.

2. The vehicle airbag device according to claim 1,
wherein the module fixing part comprises a downwardly extended part having a C-shaped or U-shaped cross section and an end surface formation part,
wherein the downwardly extended part includes a vertical surface part and a pair of side surface parts that extend from respective sides of the vertical surface part,
wherein the end surface formation part is configured to serve as a lower end surface of the downwardly extended part and also to serve as an attachment surface of the airbag module,
wherein the fragile part is a width-reduced shape part of which the width is reduced with an approach to the separation prevention part,
wherein the width-reduced shape part is a part in each of the pair of side surface parts and has a triangular shape when viewed from a side, and
wherein the separation prevention part is at a position in the vertical surface part that laterally joins a far-side end of each of the width-reduced shape parts in the respective side surface parts.

3. The vehicle airbag device according to claim 1, wherein the separation prevention part is provided with a hinge formation part.

4. The vehicle airbag device according to claim 1, wherein the fragile part is provided with, at a front thereof, a notch part serving as a breakage starting point.

* * * * *